US008145936B2

(12) United States Patent  
Seelig et al.

(10) Patent No.: US 8,145,936 B2  
(45) Date of Patent: Mar. 27, 2012

(54) AUTOMATED COMPUTING APPLIANCE DISASTER RECOVERY

(75) Inventors: David Seelig, Seattle, WA (US); Stephen Czeck, St. Paul, MN (US)

(73) Assignee: McAfee, Inc., Santa Clara, CA (US)

( * ) Notice: Subject to any disclaimer, the term of this patent is extended or adjusted under 35 U.S.C. 154(b) by 275 days.

(21) Appl. No.: 12/277,634

(22) Filed: Nov. 25, 2008

(65) Prior Publication Data

US 2009/0222690 A1 Sep. 3, 2009

Related U.S. Application Data

(60) Provisional application No. 61/032,342, filed on Feb. 28, 2008.

(51) Int. Cl.
*G06F 11/00* (2006.01)
(52) U.S. Cl. .............................. 714/2; 714/27
(58) Field of Classification Search .................. 714/2, 27
See application file for complete search history.

(56) References Cited

U.S. PATENT DOCUMENTS

| | | | |
|---|---|---|---|
| 6,347,375 B1 * | 2/2002 | Reinert et al. .................. 726/24 |
| 6,813,725 B1 * | 11/2004 | Hanes et al. ...................... 714/2 |
| 7,024,581 B1 * | 4/2006 | Wang et al. ........................ 714/2 |
| 7,062,672 B2 * | 6/2006 | Owhadi et al. ..................... 714/6 |
| 7,131,026 B2 * | 10/2006 | Denninghoff et al. ............. 714/6 |
| 7,386,761 B2 * | 6/2008 | Abali et al. ....................... 714/27 |
| 7,555,679 B2 * | 6/2009 | Cheston et al. ............. 714/38.13 |
| 7,591,018 B1 * | 9/2009 | Lee .................................. 726/24 |
| 7,650,531 B2 * | 1/2010 | Yeung et al. ....................... 714/5 |
| 2002/0163760 A1 * | 11/2002 | Lindsey et al. ................ 360/134 |
| 2004/0078680 A1 * | 4/2004 | Hu et al. .......................... 714/36 |
| 2004/0128664 A1 * | 7/2004 | Johnson ......................... 717/168 |
| 2004/0153733 A1 * | 8/2004 | Lin ..................................... 714/6 |
| 2004/0172578 A1 * | 9/2004 | Chen et al. ....................... 714/15 |
| 2005/0240815 A1 * | 10/2005 | Purkeypile et al. ............. 714/15 |
| 2006/0005064 A1 * | 1/2006 | Graham et al. .................... 714/2 |
| 2006/0085685 A1 * | 4/2006 | Cheston et al. .................. 714/38 |
| 2006/0224794 A1 * | 10/2006 | Stevens .......................... 710/62 |
| 2008/0155302 A1 * | 6/2008 | Mue et al. .......................... 714/2 |
| 2008/0168310 A1 * | 7/2008 | Saretto et al. ................... 714/30 |
| 2009/0222466 A1 | 9/2009 | Allison et al. |
| 2009/0222812 A1 | 9/2009 | Nissen et al. |

* cited by examiner

*Primary Examiner* — Marc Duncan
(74) *Attorney, Agent, or Firm* — Schwegman, Lundberg & Woessner, P.A.

(57) ABSTRACT

A system and method for automatic disaster recovery of a computing appliance including reconstruction of its previous operational state. A configuration bundle that includes configuration data, software revision level and a list of system updates is used to recover the device's operation state. The system and method can also be utilized to recover a not fully functional member of a clustered computing system from the configuration information stored on other members of the cluster.

20 Claims, 11 Drawing Sheets

```
<SysConfig>

<!-- metadata contains information used for processing and validating the configuration bundle -->
    <metadata>
        <comment type="string">
            <!-- Arbitrary data - sometimes used to indicate why the bundle was created -->
        </comment>
        <patches type="list">
            <!-- The "patches" values are only used during a configuration restore to warn -->
            <!-- the user if the patches installed when the configuration bundle was created -->
            <!-- differ from those currently installed.  The policy may be installed as long -->
            <!-- as the major/minor version is correct -->
            <!-- Except for in FULL bundles, this item may be empty. -->
            <item type="list:string">
                <!-- One item per installed patch with the patch name in it -->
            </item>
        </patches>
        <user type="string">
            <!-- This field contain the username of the user who caused this bundle to be created -->
        </user>
        <creation_time type="integer">
            <!-- POSIX time when this configuration bundle was created -->
        </creation_time>
        <system_revision type="string">
            <!-- Major/Minor version of the firewall.  i.e. 7.0.0.00 -->
        <source type="string">
            <!-- FQDN of the host where this configuration bundle was created -->
        </source>
        <bundle_type type="string">
            <!-- The type of bundle this is.  Currently one of: BACKCHANNEL, ENTERPRISE, POLICY, FULL -->
        </bundle_type>
```

FIG. 8A

```xml
<policy_version type="tuple">
    <!-- This object contains a "unique" identifier to identify the policy contained within -->
    <!-- the bundle. The only real constraint is that there are two values, and the frequency -->
    <!-- of duplicates be small -->
    <item type="integer">
        <!-- Typically this is a sequence number for us -->
    </item>
    <item type="float">
        <!-- Typically a time stamp or similar -->
    </item>
</policy_version>
<domains type="list">
    <!-- One entry per unique domain showing up in the XML -->
    <item type="list:string">
        <!-- Domain that will be showing up in the policy -->
    </item>
</domains>
<system_type type="string">
    <!-- The type of system this configuration bundle is for. One of: SA, HA, OTM -->
</system_type>
</metadata>

<!-- shared contains the data from SysDB shared by all domains in this policy -->
<shared>
    <!-- The SysDB shared data - This has a version dependent structure -->
    <!-- See Also: schema definition -->
</shared>

<!-- There is will be one unique domain object per domain covered by this policy -->
<unique name="FQDN.of.firewall">
    <!-- The unique SysDB data for this domain - This has a version dependent structure -->
    <!-- See Also: schema definition -->
</unique>
```

FIG. 8B

```
<!-- The DNS configuration for the box -->
<dns>
    <!-- The non-SysDB DNS configuration component for the box -->
    <!-- A "split" DNS configuration will contain "internet", "unbound" and "standby" named object -->
    <!-- An "unbound" DNS configuration will contain "unbound" and "standby" named object -->
    <!-- A "transparent" DNS configuration will contain no named objects -->
    <named region="internet | unbound | standby">
        <!-- The DNS configuration for the associated region -->
        <!-- encoded as "file" objects - See below -->
    </named>
    <common>
        <!-- The common (host.conf.*; resolv.conf.*) DNS files encoded as "file" objects - See below -->
    </common>
</dns>

<!-- The sendmail configuration for the box -->
<sendmail>
    <common>
        <!-- Only sendmail.c.mc goes here -->
    </common>
    <configuration region= >
        <!-- The configuration files for the sendmail instance running "region" index -->
        <!-- This object will contain files of the sendmail, mtac, aliases and spamfilter classes -->
        <!-- Note: aliases will be present in only the region corresponding to the internet burb -->
    </configuration>
</sendmail>

</SysConfig>
```

AUTOMATED COMPUTING APPLIANCE DISASTER RECOVERY

RELATED APPLICATIONS

This application claims the priority benefit of U.S. Provisional Application Ser. No. 61/032,342 filed Feb. 28, 2008, the contents of which are incorporated herein by reference in their entirety.

BACKGROUND OF THE INVENTION

1. Field of the Invention

The present invention is related to computer network systems, and more particularly, to a system and method for disaster recovery of a specific stand-alone computing appliance or an individual computing appliance configured for operation in a cluster.

2. Background Information

Network administrators are in a constant battle to keep the technology they manage running smoothly. Areas of particular challenge are disaster recovery, cluster management and system upgrades. Despite rapid improvements in computing power, storage technology and network bandwidth, these activities still prove a challenge to network administrators.

Disaster recovery encompasses restoring the operational state and any lost data of the system brought down by the disaster. Disasters can range from simple mis-configurations causing a single system to malfunction to multiple system failures due to a natural or man-made disaster. On either end of the spectrum the faster these mission critical systems can be brought back to their previous operational state the better. Unfortunately, the current state of technology typically requires that a network administrator spend hours re-installing software and resetting configurations to get systems back online after a disaster.

There has also been an increase in the use of clustered and/or redundant systems. Clustered systems and redundant systems add additional complexity to the disaster recovery dilemma. If clustered systems are properly designed and implemented, they tend to keep mission critical services online even if one or more nodes in the cluster should fail. This is important because re-installation and re-configuration of the failed node typically is difficult and time consuming.

In addition, systems such as clustered or redundant systems present the additional danger that mission critical service could be impacted if the replacement node is not configured correctly before it is inserted in the system. Therefore, proper recovery of a clustered system's configuration is critical.

Finally, the current security environment creates a nearly constant need to patch or upgrade systems. Device manufactures are under constant pressure to improve security and performance. Sometimes these pressures require major changes to the operating software. Unfortunately for the already stressed network administrator, major operating software changes are bound to mean significant configuration changes. In the current environment, network administrators are typically left poring through manuals to figure out how to ensure the operational state of their networks are maintained through the upgrade process.

BRIEF DESCRIPTION OF THE DRAWINGS

FIGS. 8A-8C illustrate an example embodiment of a Configuration Bundle.

SUMMARY OF THE INVENTION

Figure 1:
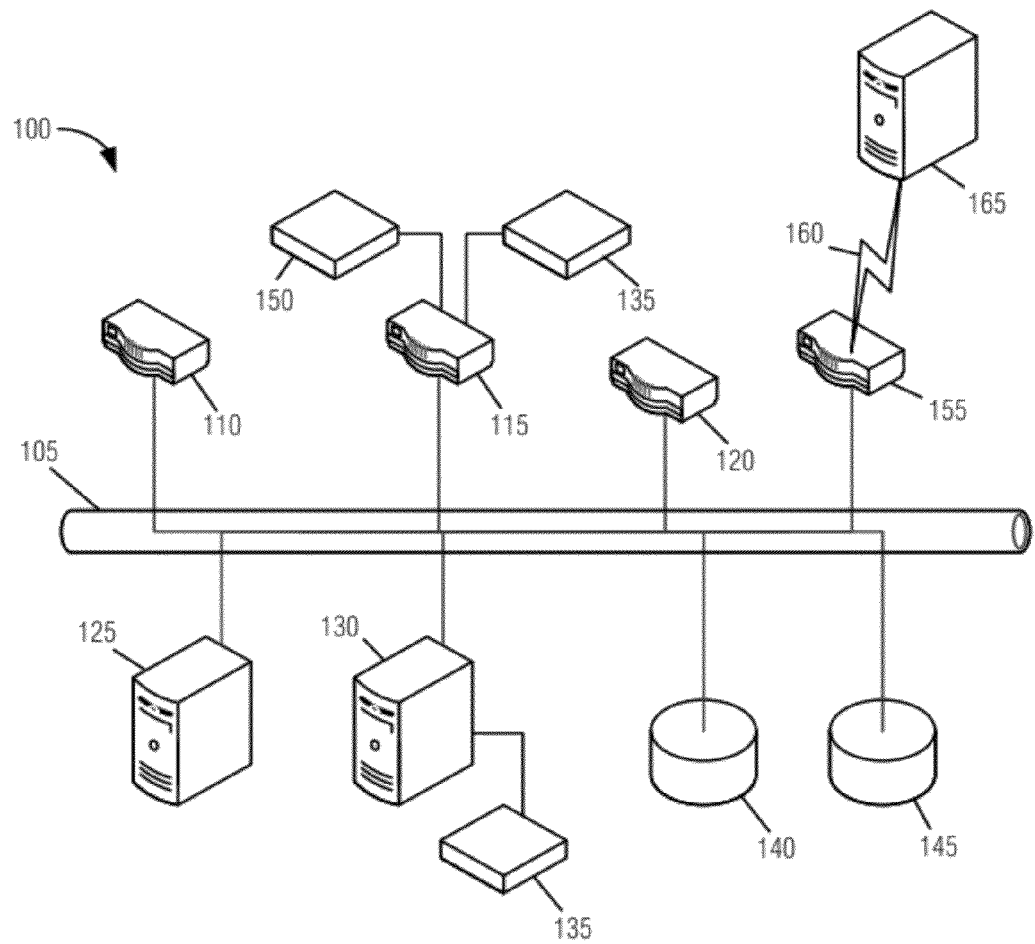
FIG. 1 illustrates an example embodiment of a system for automatically recovering, cloning or migration of a computer appliance.

The above mentioned problems with disaster recovery, system migration and other problems are addressed by the present invention and will be understood by reading and studying the following specification.

According to one aspect of the invention, recovering a computing appliance after a disaster can be accomplished by using a configuration bundle during the restoration process. First an appropriate configuration bundle must be obtained. The configuration bundle needs to include a set of configuration data, a software revision level and a list of software updates that describe the operational state of the computing appliance prior to the disaster. Once a suitable configuration bundle is obtained it needs to be saved to an external storage device. The external storage device is then made accessible to the computing appliance that needs to be restored. The computing appliance is then restored automatically by running an initialization or installation program that accesses the configuration bundle and causes the proper software to be installed. Finally, the configuration bundle is accessed to restore all necessary configuration settings to return the computing appliance to its previous operational state.

According to another aspect of the invention, migrating a computing appliance to new operating software while maintaining the computing appliance's operational state can be accomplished by using a configuration bundle. The process of migrating to new operating software begins by creating a configuration bundle on the target appliance prior to the migration. Once created the configuration bundle is saved to a storage device external to the computing appliance. Then the computing appliance is upgraded to the new operating software and the previous operational state is restored by providing the installation program access to the configuration bundle.

According to yet another aspect of the invention, recovering a computing appliance acting as a node in a clustered system can be accomplished without any previously backed up configuration information. The process of recovering a not fully functional or completely non-functional node in a cluster starts by identifying a functional node within the cluster. A configuration bundle is then created from the functional node and saved to a storage device. An installation or initialization program is then run on the node to be recovered. The installation or initialization program installs or fixes the operating software and accesses the configuration bundle to restore the node's configuration settings. The recovered node is fully configured to re-join the clustered system in its pre-malfunctioning operational state.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The systems and methods of the various embodiments described herein allow a network administrator of a computer network to manage and recover various devices whether they operate in a stand-alone or clustered configuration. Embodiments allow the network administrator to upgrade or migrate devices to a new operating system while automatically maintaining or recovering the operational state of the device under the old operating software. Other embodiments allow the network administrator to recover a device's previous operational state after some form of disaster. The disaster could be something as simple as mis-configuration to something as serious as a total hardware failure. In either case, the network administrator will be able to automatically restore the computing device to its previous operational state. Additional embodiments allow the network administrator to clone or copy a device's operational state onto a similar device. Cloning allows a network administrator to easily replace questionable hardware or build a clustered configuration.

Upgrading or migrating devices to new operating software typically requires recreating the device's current configuration within the new software. This manual reconfiguration process leaves the door open for user error and also does not account for potential changes in configuration options within the new software. Device manufacturers in an effort to keep up with security or performance demands may find it necessary to add or change the method of configuration between software versions. While documentation can be, and usually is, provided with the upgrade, it may be difficult to follow or ignored altogether by the network administrator.

Smooth seamless disaster recovery is the dream of every network administrator. No matter how well engineered or maintained equipment will ultimately fail or human errors will cause system to become hopelessly mis-configured. Unfortunately, just having a backup of the device's configuration is not helpful, if at all, until the device is restored to a similar operating software version and patch level. In situations where a backup was either not made or is out of date, disaster recovery can quickly become more like setting up a whole new network configuration. The difficulties involved in restoring devices can put organizations at risk, especially if the device is a firewall or other network security device.

The systems and methods of the various embodiments described herein provide solutions by implementing an automated device recovery, cloning and migration facility that includes automatic software and firmware patch installation and complete configuration recovery.

FIG. 1 illustrates a computer network 100 which depicts various embodiments. Computer network 100 includes a network 105, a plurality of computing appliances 110, 115, 120, a server 125, an administration console 130, a plurality of network accessible storage devices 140, 145, a plurality of external computer-readable storage devices 135, 150, a remote access gateway 155 and remote server 165. Computing appliances 110, 115, 120 may be firewalls, routing devices, security devices, web servers or any other sort of computing device one might utilize in a networked environment. For the purposes of illustration in the various embodiments computing appliance 115 will be the computing appliance to be restored, cloned or migrated to new operating software. The network 105 is a local-area or a wide-area network used to transmit data between the various network nodes 110, 115, 120, 125, 130, 140, 145, 155. The server 125 is a generic network attached server that also functions within some embodiments as a PXE (pre-execution environment) server allowing for any of the computing appliances 110, 115, 120 to boot from the PXE server 125 during the recovery or cloning process. The Administration console 130 is utilized within the various embodiments for storing Configuration Backups, also known as Configuration Bundles, which are defined further below and in FIG. 2. The Administration console 130 is also utilized within the various embodiments for creating Disaster Recovery/Cloning (DR/C) media 135, 140. The DR/C media 135, 140 is utilized by the computing appliance 115 during the recovery or cloning process to restore the appliance's 115 previous operational state.

FIG. 1 also includes a remote access gateway 155 used to connect the network 105 to at least a remote server 165. The remote server 165 is used within various embodiments to illustrate the ability to download installation software, software patches and firmware patches from computing appliance 115 manufacturer. Downloading software from the remote server 165 is accomplished via FTP, HTTP, HTTPS, BitTorrent, Gopher, Gnutella, WebDAV, or any other commonly supported OSI layer 7 protocol. The remote connection 160 can be any sort of broadband or PSTN connection that supports transport of a OSI layer 7 protocol.

The following embodiments focus on the computing appliance 115 as the target device for migration, recovery, or cloning, but it would be understood by anyone skilled in the art that any computing device 110, 115, 120, whether connected to the network 105 or not, could utilize the systems and methods disclosed herein.

Figure 2:
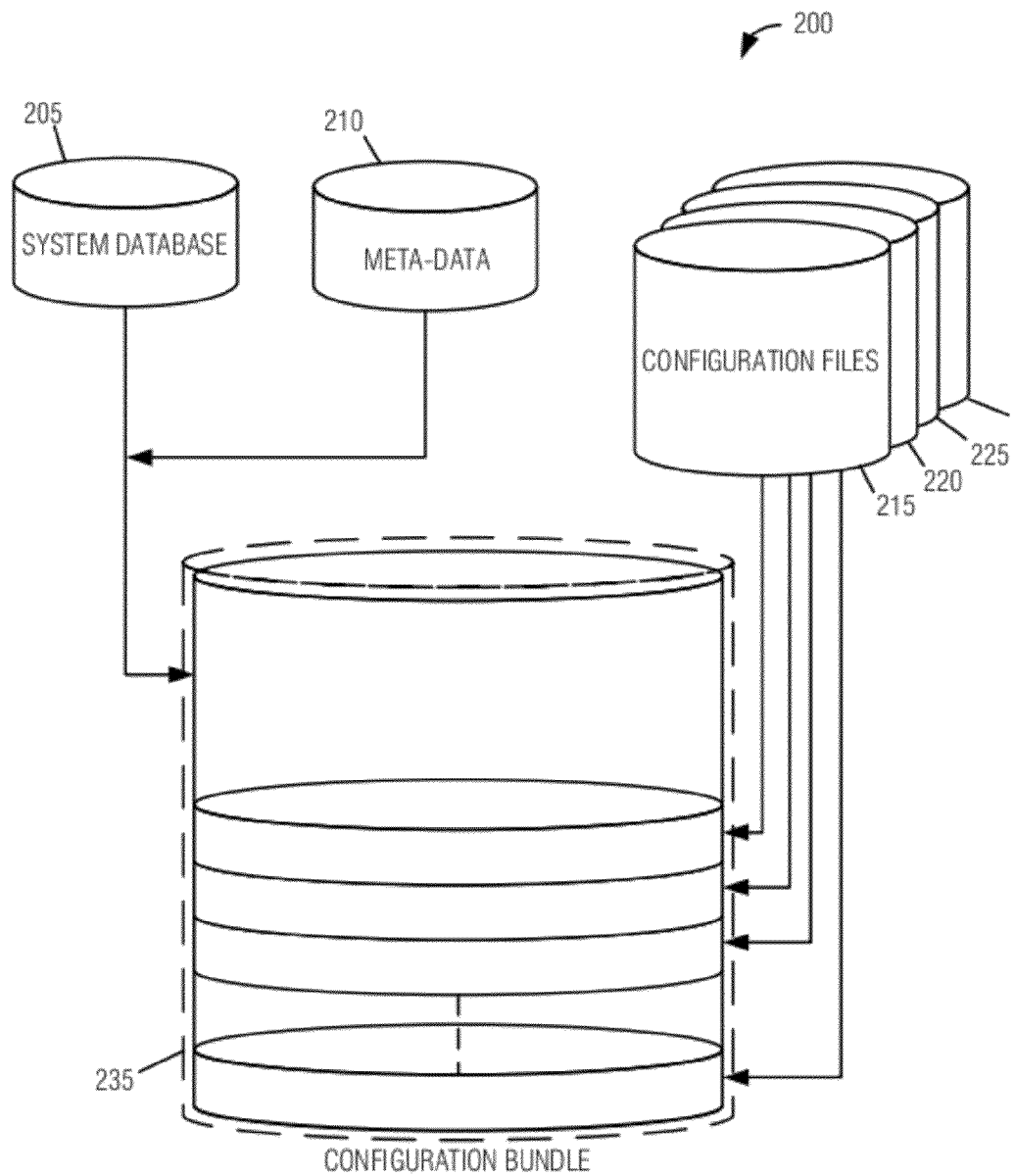
FIG. 2 illustrates an example embodiment of a Configuration Bundle.

Configuration Bundle:

A Configuration Bundle or Configuration Backup is the data file which facilitates the total recovery of a computing appliance's operational state upon restoration, cloning or migration to new operating software. FIG. 2 illustrates an example embodiment of a Configuration Bundle, which includes information from a system database 205, meta-data 210 and one or more configuration files 215, 220, 225, 230. The system database 205 includes information such as rules, network objects, policies, administration accounts or other information required for the operation of a computing appliance. The system database 205 is typically unique to each stand-alone appliance or shared across a plurality of computing appliances operating as a cluster. Clustered environments could include, but are not limited to, high-availability (HA) clusters and one-to-many load-balancing clusters. The HA clusters could be configured as peer-to-peer failover, primary/standby failover or load sharing.

In one embodiment, the meta-data 210 is comprised of a series of key-value pairs that detail information about the version and patch level of the computing appliance or cluster, how the computing appliance is configured to operate (stand-alone or clustered), the computing appliance's domain and other miscellaneous information. Table 1 provides an example listing of information that could be stored in the meta-data 210.

TABLE 1

| Key: | Value: |
| --- | --- |
| Bundle_type | FULL |
| Comment | Test configuration bundle |
| Creation_time | 01012008093445 |
| Domain | test.a.com |
| Patches | [60123, 60124, 60125, . . . ] |
| Policy_version | 123456789.123 |
| Source | test2.a.com |
| System_version | 6.0.1.3.0 |
| System_type | SA |
| User | testerA |

As will become evident later, one of the most critical pieces of information stored in the meta-data is the list of system or firmware patches applied to the computing appliance. This list facilitates automatic reinstallation of all previously applied patches during a recovery or cloning process.

The configuration files 215, 220, 225, 230 include computing appliance specific information not suitable for storage in the system database 205. For example, domain name service (DNS) may require information unique to each appliance be stored in a file. Configuration files are unique to each computing appliance regardless of whether the appliance is operating in a stand-alone or clustered configuration. Computing appliances operating in a clustered configuration may share much of the information stored in various configuration files. Additionally, in some embodiments the computing appliances in a clustered configuration will have copies of configuration files 215, 220, 225, 230 from all members of the cluster. As will be explained in detail later, retaining copies of configuration files 215, 220, 225, 230 from all members of a cluster (for example 110, 115, 120) allows any member of the cluster to be restored using a Configuration Bundle 235 from any other member of the cluster.

As depicted by FIG. 2, the configuration bundle 235 is created by storing information from the system database 205, the meta-data 210 and one or more configuration files 215, 220, 225, 230 from one or more computing appliances in a single file. FIG. 8A-8C illustrate an example embodiment of a combined configuration file stored in a Configuration Bundle. FIG. 8A-8C illustrate a file structure for combining the meta-data 210, the system database 205 and other computing appliance specific configuration data. The example embodiment illustrated in FIG. 8A-8C would be stored as an encrypted extensible markup language (XML) file. In another example embodiment the configuration bundle 235 is stored as a series of XML or structured data files compressed into a single archive file using TAR or ZIP technologies. In some embodiments, the Configuration Bundle 235 is automatically encrypted for security purposes. In some embodiments the network administrator (end-user) will be given the option of applying an additional encryption using a key of their choosing.

Referring back to FIG. 1, Configuration Bundles 235 can be produced on a target computing appliance 110, 115, 120 or on an administration console 130. Once created, Configuration Bundles 235 can be stored on the computing appliance 110, 115, 120, the administration console 130, some form of network attached storage 140, 145 or an external computer-readable storage media 135. Once created Configuration Bundles 235 can be stored and backed up in the same manner as any other critical data.

Disaster Recovery/Cloning Media:

The Disaster Recovery/Cloning (DR/C) media is some form of computer-readable media, such as a USB flash drive, external hard drive, network attached storage device or internal hard drive, that includes a Configuration Bundle and all software and firmware patches applied to the target computing appliance. The DR/C media is used in conjunction with some form of initialization or installation program to recover or clone a computing appliance.

Figure 3:
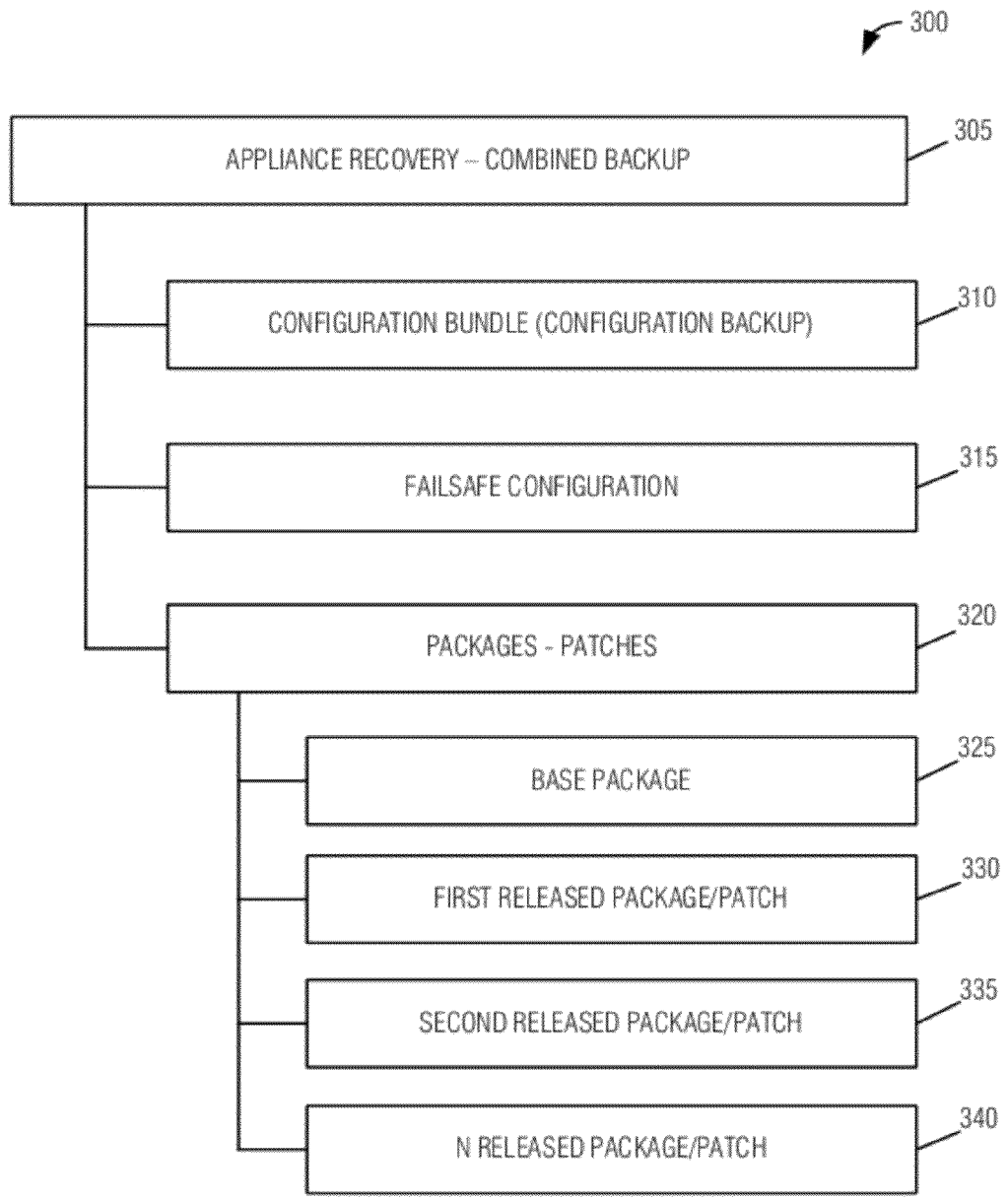
FIG. 3 illustrates an example embodiment of the directory structure for a disaster recovery/cloning media.

FIG. 3 provides a graphical representation of an example embodiment of the DR/C media 300. A Configuration Bundle 310, as described in detail above in reference to FIG. 2, is included on the DR/C media 300 for restoration or cloning of the computing appliance's configuration settings. A fail-safe configuration file 315 is included on the DR/C media 300 to ensure that the target device can be restored to a minimal operational state if somehow the Configuration Bundle was corrupted or otherwise unusable. Finally, a directory of patches or packages 320 is included. The patches directory 320 typically includes one or more software or firmware patches 325, 330, 335, 340 that have been applied to the computing appliance. In some embodiments the patches directory 320 will be empty because the target computing appliance will not have had any patches applied. In other embodiments, the patches directory 320 will have at least one patch or package being the base package 325. The base package 325, when present, typically represents the base operating software installed on the target computing appliance.

Figure 4:
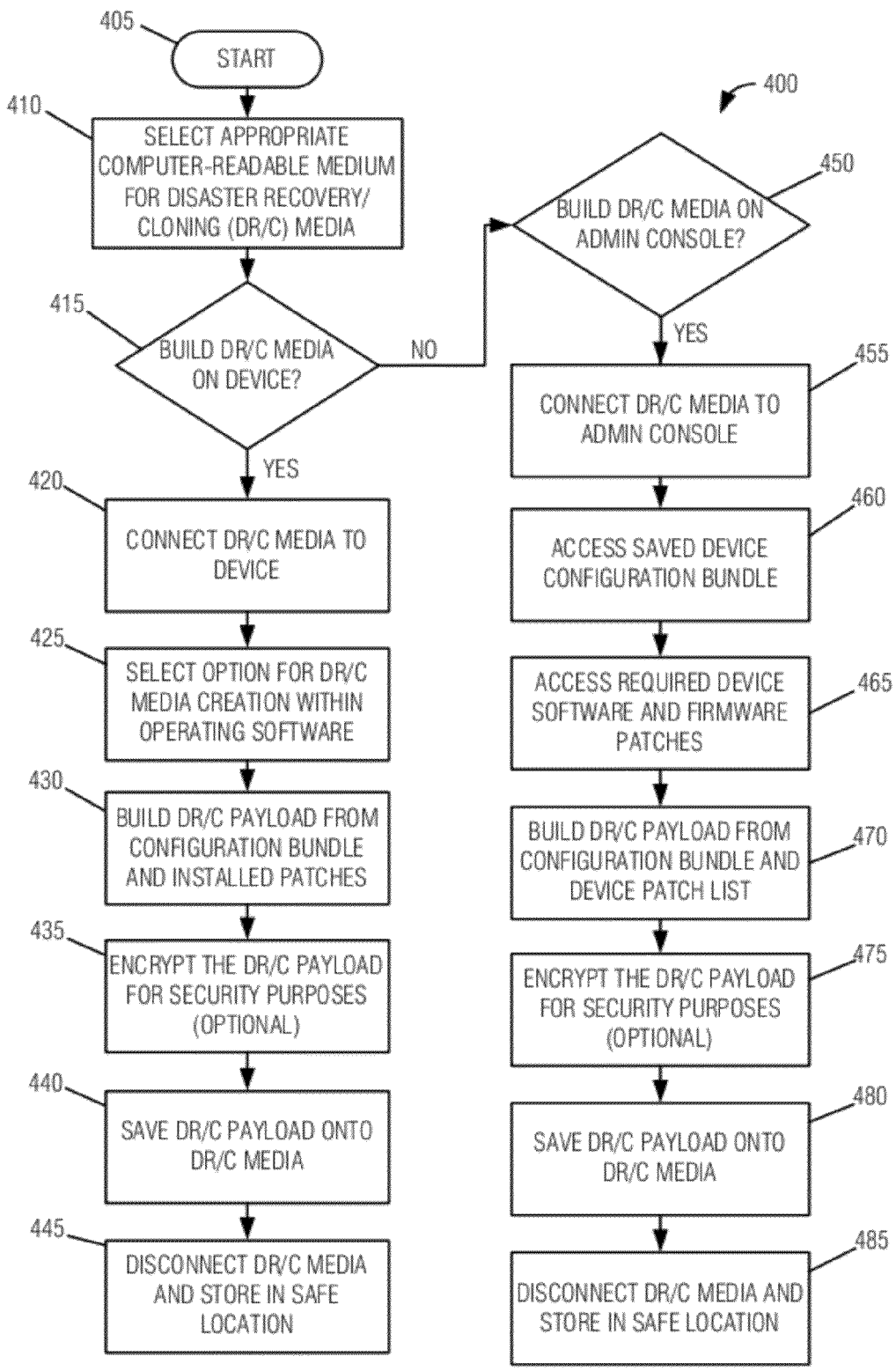
FIG. 4 illustrates an example method for creating a disaster recovery/cloning media.

Creating DR/C Media:

FIG. 4 illustrates the process of creating the DR/C media on the target appliance 115 or on the administration console 130. The process begins at step 410 by selecting an appropriate computer-readable medium for use as the DR/C media. In this example embodiment the selected DR/C media is a USB flash memory slick. However, the DR/C media could be any sort of computer-readable medium accessible by the target appliance. Note, references to physical objects such as the DR/C media 135, relate back to FIG. 1.

The process continues with an option to build the build the DR/C media 135 on the target computing appliance 115, at step 415. If the network administrator chooses to build the DR/C media 135 on the target computing appliance 115, the process moves on to step 420. Otherwise, the process moves on to step 450 building the DR/C on the administrator console 130. Building the DR/C media 135 on the target appliance 115 ensures easy access to all required data and all installed software or firmware patches.

In step 420 the network administrator (or end-user) connects the DR/C media 135 to the target computing appliance 115. In this example embodiment, connecting the DR/C media 135 involves simply plugging it into an available universal serial bus (USB) port on the target computing appliance 115. Once connected, the network administrator can start the creation process by selecting the appropriate option within the computing appliance's operating software, at step 425. In another embodiment the computing device 115 could be configured to automatically run the DR/C media creation software whenever a certain type of media is attached or when a certain USB port is utilized, eliminating step 425.

At step 430, the computing appliance 115 builds the DR/C payload, which includes a Configuration Bundle, Fail-safe Configuration and all installed patches (or packages). After the DR/C payload is built at step 430, either the system, the user or both can encrypt the payload for security purposes at step 435. The DR/C payload is then saved onto the DR/C media 135 at step 440. Finally, the network administrator can disconnect the DR/C media 135 and store it in a safe location, step 445. In some embodiments, the computing appliance 115 indicates that the process is complete by an audible signal, displaying a message on a screen, sending an e-mail to a pre-configured address or by registering an event in a network monitoring system.

If the network administrator chooses to build the DR/C media 135 on a administration console 130, then the process starts at 455 with the connection of the DR/C media 135 to the administration console 130. The administration console 130 then accesses the appropriate Configuration Bundle saved on the target computing appliance 115, a network server 125, the administration console 130 or any other network accessible storage devices 140, 145 at step 460. In step 465, the administration console 130 accesses the software and firmware patches or packages listed in the Configuration Bundle. The required patches or packages could be accessed from the target computing appliance 115, from the remote server 165, a local server 125 or from any other network accessible storage device 140, 145.

At step 470, the administration console 130 builds the DR/C payload, which includes a Configuration Bundle, Failsafe Configuration and all installed patches (or packages). After the DR/C payload is built at step 470, either the system, the user or both can encrypt the payload for security purposes at step 475. The DR/C payload is then saved onto the DR/C media 135 at step 480. Finally, the network administrator can disconnect the DR/C media 135 and store it in a safe location, step 485. In some embodiments, the administration console 130 indicates that the process is complete by an audible signal, displaying a message on a screen, sending an e-mail to a pre-configured address or by registering an event in a network monitoring system.

Disaster Recovery—Stand-Alone Computing Appliance:

The following example embodiment focuses on the recovery of a single stand-alone computing appliance 115 after some sort of catastrophic disaster, such as a hard drive failure. Recovery of the computing appliance 115 is facilitated by the DR/C media 135 detailed above. Once again all references to physical devices relate back to FIG. 1.

Figure 5:
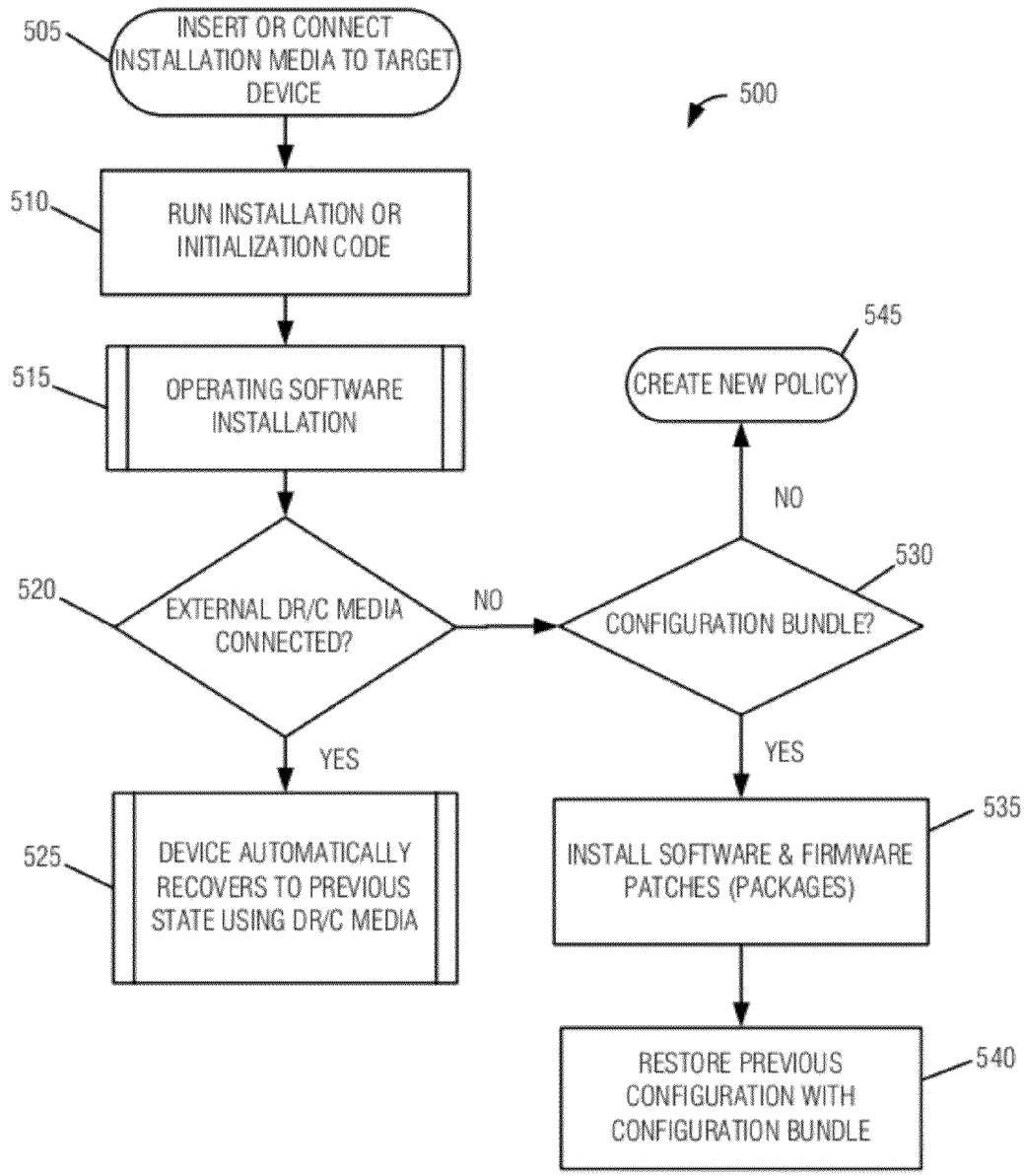
FIG. 5 illustrates an example method for recovering a computing appliance.

FIG. 5 illustrates an example embodiment of the computing appliance recovery process 500. The process is initialized by inserting or connecting installation media to the target device 505. The next step 510 involves running the installation or initialization software from the installation media. Step 510 is accomplished in an example embodiment by rebooting the target computing appliance 115; upon reboot the computing appliance 115 automatically runs the installation program. In another example embodiment, the computing appliance 115 is configured to connect to a PXE boot server located on the network 105 upon startup. In this embodiment, the PXE boot server 125 includes the required installation code. In the various embodiments, the process continues at step 515 with the operating software being installed automatically.

After the operating software is installed, the computing device 115 detects whether or not DR/C media 135 is connected and available, at step 520. If the computing appliance 115 finds DR/C media 135 the previous operational state is automatically recovered from the DR/C media, at step 525. If there is not DR/C media 135 connected or accessible on a network storage device 140, 145, the process moves to step 530 and allows the network administrator to continue restoration from a Configuration Bundle. If the network administrator does not have an appropriate Configuration Bundle, then the process ends with the creation of a default (or failsafe) configuration (policy) 545 leaving the computing appliance in a default operational state.

In one embodiment, the configuration bundle does not include the patches necessary to bring the computing appliance 115 up to the required revision level. In those situations, at step 535, the network administrator installs any patches or packages necessary to bring the computing appliance 115 up to the revision level required by the Configuration Bundle. This process can be accomplished by accessing the computing appliance 115 from the administration console 130 or on the computing appliance 115 itself. Working on the computing appliance 115 may require connecting some sort of terminal if the computing appliance 115 does not include any sort of display device. In an example embodiment, the software and firmware patches are stored on the administration console. In another example embodiment, the software and firmware patch may be obtained over an internet connection 160 to the manufacturer's remote server 165. In yet another example embodiment, the software and firmware patches are accessed from the network attached storage device 145.

Once the computing appliance 115 is brought up to the proper patch level, the previous operational state can be restored with the Configuration Bundle at 540.

In another embodiment, the configuration bundle includes the patches and packages (or pointers to the patches and packages) necessary to bring the computing appliance 115 up to the required revision level. In those embodiments, the network administrator simply points at the configuration bundle and the patches are applied as part of the restore at 535.

Again, once the computing appliance 115 is brought up to the proper patch level, the previous operational state can be restored with the Configuration Bundle at 540.

Cloning a Computing Appliance:

The same set of procedures illustrated in FIG. 5 and described above can be used to clone an operational (or non-operational) computing appliance. This process may be useful to upgrade hardware, add a computing device to a cluster or create a cold-spare. If the cloned device is added to the same network as the original device, the network administrator will need to make small configuration changes after cloning to any device specific parameters like hostname or static IP addresses.

Disaster Recovery—Clustered Computing Appliance:

Despite careful precautions, backup procedures and ever improving hardware performance unexpected disasters do happen. The use of clustered systems for mission critical applications such as network firewalls, multi-function network security devices or web servers has become the norm. However, even clustered systems can experience unexpected malfunctions and are inherently more difficult to configure. When a clustered system fails the other systems in the cluster will maintain the mission critical function, but the failed system will need to be restored. Restoration of the failed system could require anything from minor configuration or policy changes to complete hardware replacement. Even mere configuration adjustments can be complicated in a clustered system. Therefore, a mechanism that provides an automated process for recovering to new hardware or simply resetting a corrupted configuration would be very beneficial.

In one embodiment, each cluster of computing appliances includes a primary node. The primary node is considered the primary owner of the configuration. In one such embodiment, when changes are made on the primary node in a cluster configuration, a configuration bundle is built and pushed out to the other nodes in the cluster. The bundle that is built contains data for every node in the cluster. So the same configuration bundle is pushed to every node, and each node is responsible for applying that configuration to the operating software as required based on the shared and unique aspects of the configuration. An added benefit of this approach is that if the primary node in the cluster fails, another node in the cluster can become the primary and has all the data required to build configuration bundles of the same format and push them out to the remaining nodes in a cluster.

In one embodiment, the configuration bundle includes configuration data common to all nodes in the cluster and configuration data unique to each node in the cluster. In one such embodiment, the IP address of each node is stored as part of the configuration data unique to each node in the cluster.

Figure 6:
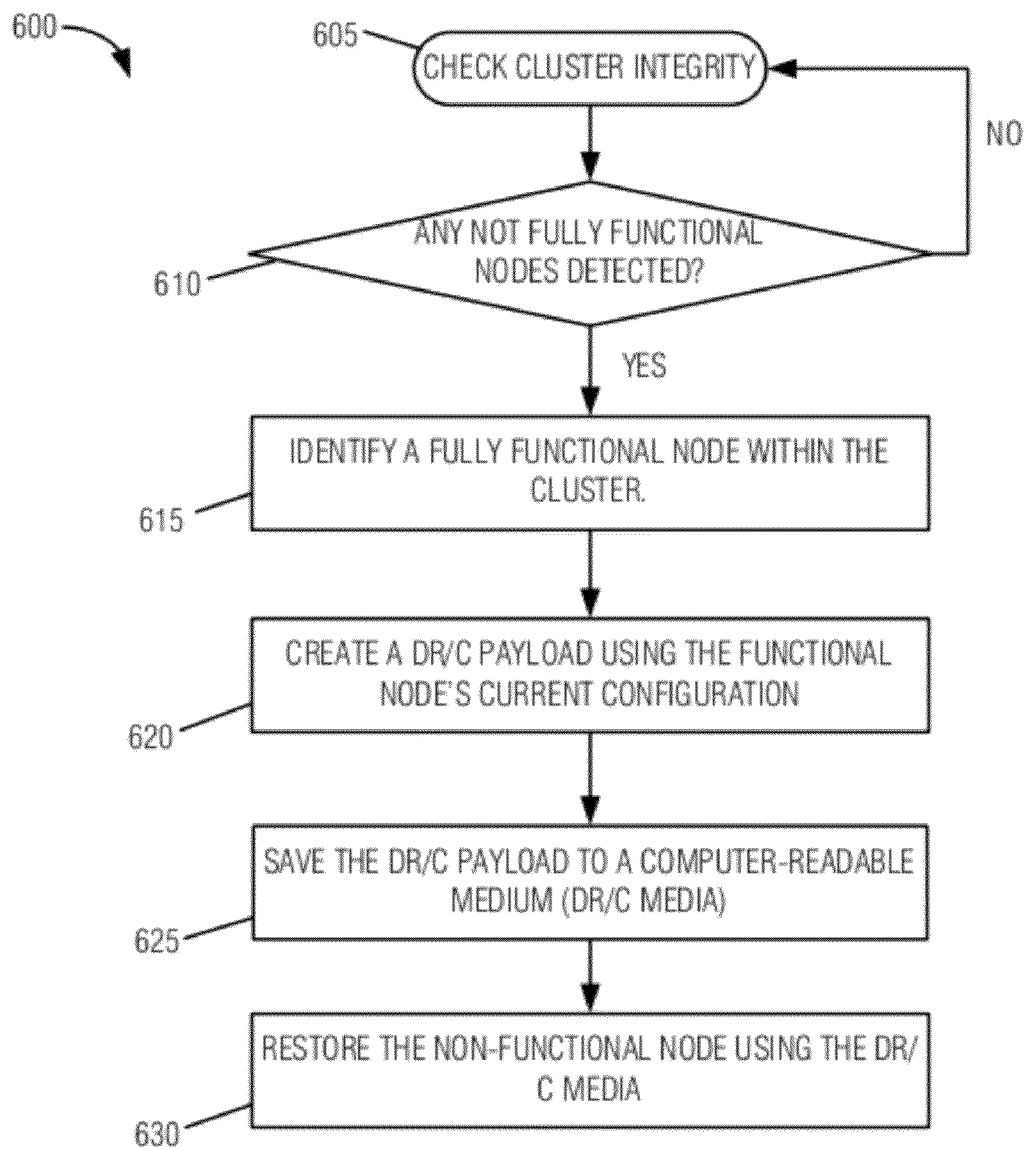
FIG. 6 illustrates an example method for recovering a not fully functional computing appliance (node) within a cluster configuration.

FIG. 6 illustrates an example embodiment of a process 600 for recovering a not fully functional clustered computing appliance to a fully operational state based on a configuration bundle stored on nodes within the cluster. The process 600 does not require any previously backed up configuration data for any of the clustered computing appliances so long as at least one appliance in the cluster remains operational.

The process 600 begins by checking the integrity of the cluster 605. If any computing appliances (nodes) are found to be not fully functional 610, the process identifies a fully functional computing appliance (node) 615. The functional node is used to create a DR/C payload 620 that can be utilized to restore the non-functional node. The functional node is able to produce a Configuration Bundle that includes configuration information for all nodes in the cluster. Whenever changes are made to any node in the cluster, the changed node's configuration information is shared among all members of the cluster in order to facilitate this recovery functionality.

The process 600 continues by saving the DR/C payload to a computer-readable medium 625 to create the DR/C media. The non-functional node is then restored using the DR/C media with the process outlined above in reference to FIG. 5. In an example embodiment, the recovery process selects the proper configuration data within the DR/C media by matching to one of the device specific parameters, such as hostname.

In one embodiment, the restored node will be a clone of one of the nodes in the cluster, including, in some instances, the IP address or host name of the node being cloned. In one such embodiment, a mechanism is included for changing the IP address or host name of the node being cloned and restoring the node with a new IP address or host name.

Configuration Management—Networked Computing Appliances:

Also related to clusters are the creation of clusters, and the use of configuration bundles in that process. The process of 'clustering' a group of devices requires an exchange of configuration bundles and programs which can extract the required data from each bundle to build the common configuration bundle. In one embodiment, the process for registering a subsequent node to the cluster involves providing a configuration bundle from that node to the primary, having the primary select the relevant unique configuration data out of that bundle, and returning a second configuration bundle which includes the entire configuration needed to create both nodes as a result. After the second bundle has been restored on the secondary device, the nodes are considered clustered.

Configuration Management—Central Management:

In one embodiment, configuration bundles are used as part of centralized management of computing appliances in a network. In one such embodiment, the configuration data for centrally managed servers and for centrally managed clustered servers is stored or even formed by the centralized manager and applied to all the nodes in the network. The method of distribution is similar to applying configuration restores from an administrative console, except that, in this embodiment, the configuration data is built on the central management device (it is not a piece of data that has been provided by that device), and it is distributed in the configuration bundle format using the same processing that would be used in each of the other cases.

It can be difficult to add new devices to centrally managed systems. In one embodiment, a configuration bundle from the new device is sent to the central management station. The central management station extracts the relevant pieces of information. The configuration is then managed by the central device and changes made on that server are applied to the managed nodes, including the newly added node, as required using the configuration bundle format.

Migration to New Operating Software:

Migration between major revisions of operating software presents significant challenges, especially when the migration involves critical network components like firewalls, security devices or routers. However, not keeping up with a manufacturer's upgrades leaves you potentially vulnerable to new security threats not handled by previous version of software. Additionally, manufacturers' often provide useful new features in the new operating software, but do not support them in past versions. The key to a successful migration is maintaining the computing appliance's operational state. When there are significant changes between the operating software versions, it may be impossible for the network administrator to maintain the computing appliance's operational state during upgrade. Therefore, an automated process to ensure an upgraded computing appliance maintains its previous operational state is needed.

Figure 7:
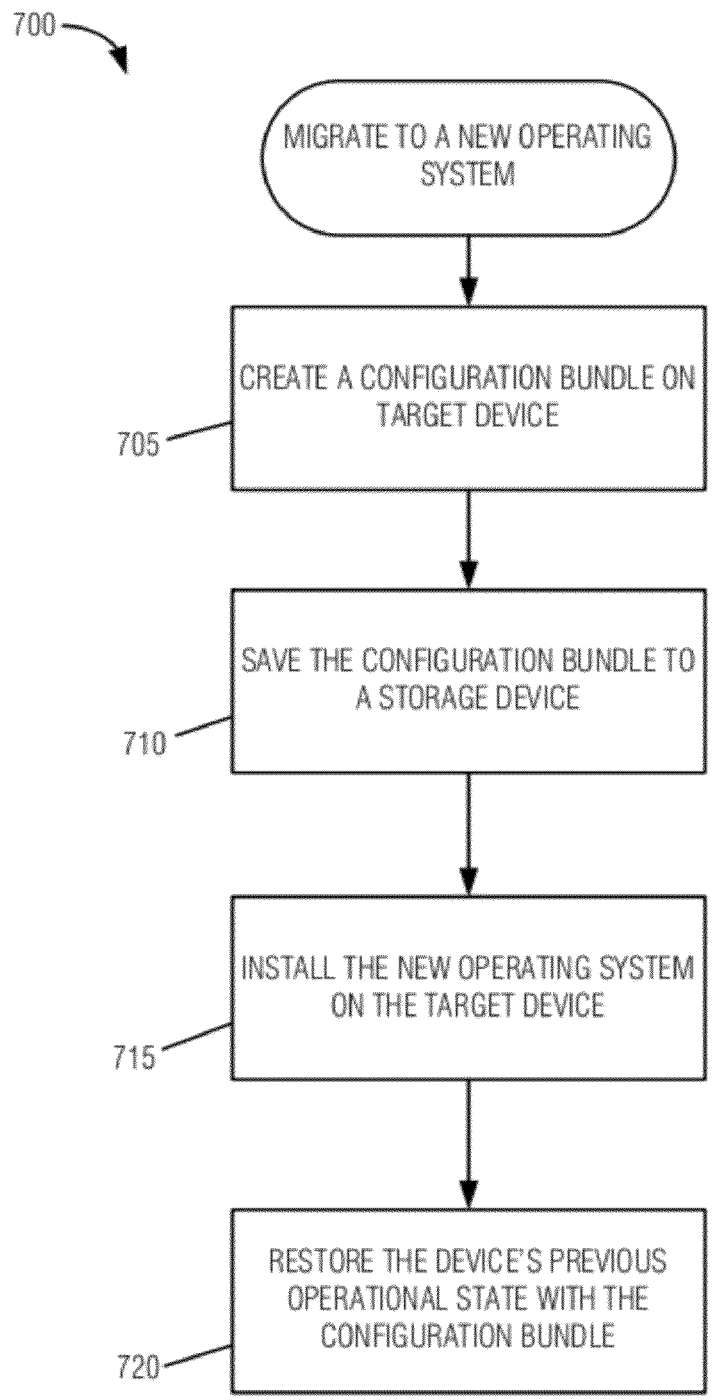
FIG. 7 illustrates an example method for migration of a computing appliance to a new operating system while maintaining its previous operational state.

The process 700 illustrates an example embodiment of a process for migration of a computing appliance to new operating software (operating system) while maintaining the computing appliance's operation state. In discussing the process 700 illustrated in FIG. 7 physical devices, such as the target computing appliance 115, will be discussed in reference to FIG. 1.

One exemplary embodiment of the migration process 700 starts with the creation of a Configuration Bundle on the target device 705. The Configuration Bundle could also be created by the administration console 130, or any system running the appropriate software application. Some embodiments of the creation process 705 will also include a translation of the configuration data from the old operating software to the new operating software. The translation process may include mapping configuration parameters between the different configuration data structures. Once the Configuration Bundle is created, the next step in process 700 saves the Configuration Bundle to a storage device 710. In an example embodiment, Configuration Bundle is saved to an external storage device 135, such as a USB flash drive. In another example embodiment the Configuration Bundle is saved on the Administration Console 130. In yet another example embodiment the Configuration Bundle is saved on a network accessible storage device 140, 145.

Once the Configuration Bundle is safely saved on an external storage device, the new operating system is installed on the target computing appliance 715. Finally, the computing appliance 115 is restored to its previous operational state 720. In an example embodiment the restoration occurs automatically if the USB flash drive 135 with a Configuration Bundle is detected by the installation program. In another example embodiment the installation program prompts the network administrator (end-user) for the location of a Configuration Bundle allowing the restoration process to proceed automatically once the new operating software installation is complete.

Migration from a Competitor's Appliance:

Migration between appliances from different competitors can also present significant challenges, especially when the migration involves critical network components like firewalls, security devices or routers. The key to a successful migration is maintaining the computing appliance's operational state. When there are significant changes between the competing appliances, it may be impossible for the network administrator to maintain the computing appliance's operational state during upgrade. Therefore, an automated process to ensure that a system migrated from a competitor's appliance maintains its previous operational state is needed.

Figure 9:
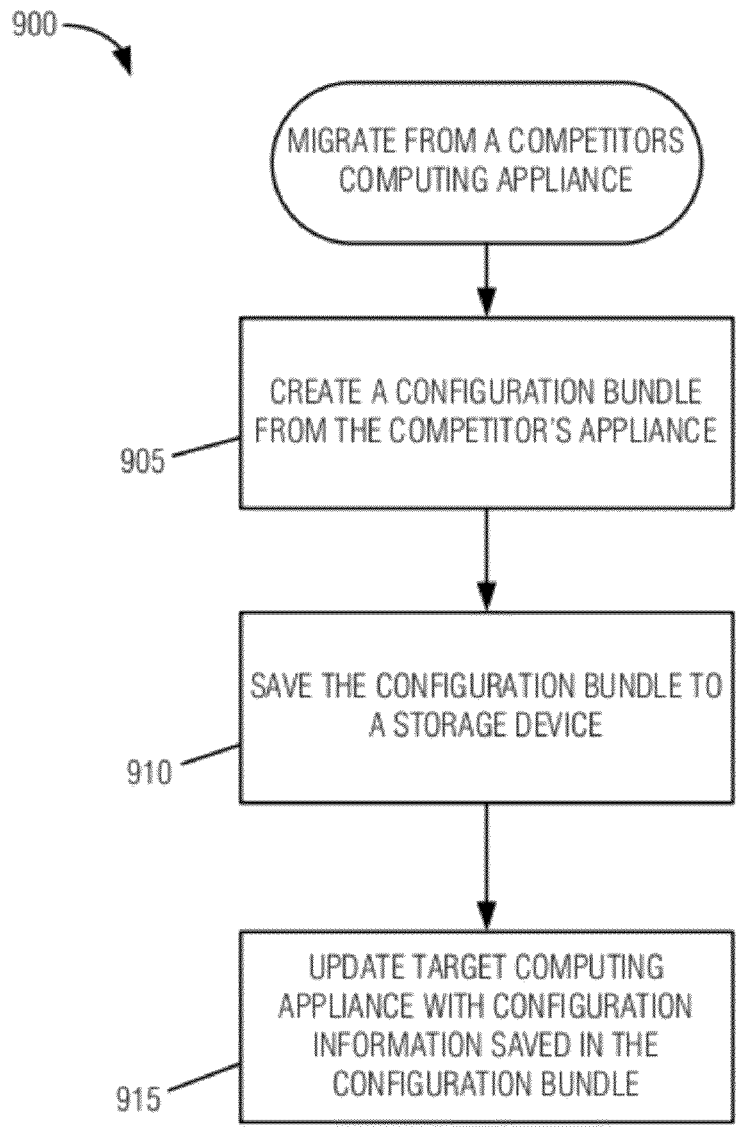
FIG. 9 illustrates an example method for migration of a computing appliance to a different manufacturer's operating system while maintaining its previous operational state.

Once again, a process similar to process 700 can be used to migrate the operational state of a competitor's machine to a machine based on your technology, while maintaining the operational state in the new computing appliance. One such process 900 is shown in FIG. 9. Once again, the Configuration Bundle is created 905. However, in this embodiment the Configuration Bundle is created from the configuration data on the competitor's computing appliance 905. In one example embodiment, the Configuration Bundle is created by the administration console 130. In another embodiment, the Configuration Bundle is created by any system running the appropriate software application. When migrating from a competitor's computing appliance the creation process 905 will also include a translation of the configuration data from the competitor's operating software. The translation process may include mapping configuration parameters between the different configuration data structures. Once the Configuration Bundle is created, the next step in process 900 saves the Configuration Bundle to a storage device 910. In an example embodiment, Configuration Bundle is saved to an external storage device 135, such as a USB flash drive. In another example embodiment the Configuration Bundle is saved on the Administration Console 130. In yet another example embodiment the Configuration Bundle is saved on a network accessible storage device 140, 145.

Migration from a competitor's computing appliance is completed at 915 by updating the target computing appliance 115 with the configuration information saved in the Configuration Bundle. In an example embodiment the upgrade occurs automatically if the USB flash drive 135 with a Configuration Bundle is detected by an initialization program run on the target device 135. In another example embodiment the network administrator (end-user) selects the location of a Configuration Bundle through a menu option on the target computing appliance 115 allowing the upgrade process to proceed with a Configuration Bundle saved anywhere on the network 105 accessible by the target computing appliance.

In the above discussion, the terms "computer," "appliance," "device" or "node" are defined to include any digital processing unit. Examples include any network appliance, personal computer, workstation, mainframe, server, or supercomputer capable of embodying the inventions described herein. It would also be evidence to one of ordinary skill in the art that virtual appliances, PDAs, smartphones and other mobile computing devices could be included within the definition of "computer," "appliance," "device," or "node." Additionally, in the above discussion, the terms "network administrator" or "end-user" are defined to include any person operating or interacting with devices capable of embodying the inventions described herein. Finally, in the above discussion, the terms "patch" or "update" are defined to include any new software applied to the computing appliance that is not considered a base operating software or major revision to the operating software. Patches and updates are generally small upgrades that address specific security or functionality problems identified within the base operating software or major revision. The term "package" is used more generically to describe any single upgrade in the operating software of a computing appliance. Depending upon usage, "package" could be referring to either a "patch" or a new version of the operating software.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method for recovering a computing appliance to a previous operational state after a failure, comprising:
    creating a disaster recovery medium, wherein the disaster recovery medium includes:
        a configuration bundle, wherein the configuration bundle includes;
        a system database;
        meta data associated with the computing appliance; and
        one or more configuration files; and
    one or more software packages installed on the computing appliance;
    running, automatically upon detecting connection of the disaster recovery medium to the computing appliance; an initialization program on the computing appliance to reach a first operational state;
    accessing the disaster recovery medium from the computing appliance, wherein accessing includes reading portions of the database, the metadata and the configuration files and storing the portions read to a storage medium on the computing appliance;
    installing the software packages on the computing appliance to reach a second operational state, wherein installing includes reading, by the computing appliance, the software packages from the disaster recovery medium; and
    applying, from within the computing appliance, portions of the configuration bundle stored on the computing appliance to restore the computing appliance to the previous operational state.

2. The method of claim 1, wherein the disaster recovery medium further includes a failsafe configuration for restoring the computing appliance to a third operational state if the configuration bundle is unable to restore the computing appliance to a previous operational state.

3. The method of claim 1, wherein installing the one or more software packages includes installing a base package.

4. The method of claim 3, wherein installing the one or more software packages includes installing one or more update packages after installation of the base package.

5. The method of claim 1, wherein the running of the initialization program occurs automatically upon rebooting the computing appliance with the disaster recovery medium connected.

6. The method of claim 1, wherein accessing the disaster recovery medium includes connecting to the disaster recovery medium through the computing appliance's universal serial bus port.

7. The method of claim 1, wherein accessing the disaster recovery medium includes connecting to the disaster recovery medium over a network connection.

8. The method of claim 1, wherein creating the disaster recovery medium includes:
   detecting failure of the computing appliance; and
   retrieving the configuration bundle associated with the computing appliance from a storage location.

9. The method of claim 8, wherein creating the disaster recovery medium further includes:
   obtaining one or more software patches applied to the computing appliance; and
   saving the configuration bundle and the one or more software patches onto the disaster recovery medium.

10. The method of claim 9, wherein obtaining the one or more software patches includes
    connecting to a remote server over a network connection; and
    downloading the one or more software patches.

11. A system, comprising:
    a computing appliance;
    a disaster recovery medium connected to the computing appliance, wherein the disaster recovery medium includes:
       a configuration bundle, wherein the configuration bundle includes:
          a system database;
          meta data associatedwith the computing appliance; and
          one or more configuration files associated with the computing appliance; and
       one or more software packages;
    wherein the computing appliance automatically accesses the disaster recovery medium upon detecting connection of the disaster recovery medium to the computing appliance, wherein the accessing includes:
       running an initialization program stored on the disaster recovery medium to reach a first operational state;
       reading portions of the database, the metadata and the configuration files and storing the portions read to a storage medium on the computing appliance;
       installing the software packages on the computing appliance to reach a second operational state, wherein installing includes reading, by the computing appliance, the software packages from the disaster recovery medium; and
       applying, from within the computing appliance, portions of the configuration bundle stored on the computing appliance to restore the computing appliance to the previous operational state.

12. The system of claim 11, wherein the disaster recovery medium further includes a failsafe configuration for restoring the computing appliance to a third operational state if the configuration bundle is unable to restore the computing appliance to a previous operational state.

13. The system of claim 11, wherein the computing appliance accessing the disaster recovery medium further includes installing a base package as part of installing the software packages.

14. The system of claim 13, wherein the computing appliance accessing the disaster recovery medium further includes installing one or more update packages after installation of the base package as part of installing the software packages.

15. The system of claim 11, wherein the computing appliance is configured to run the initialization program automatically upon rebooting with the disaster recovery medium connected.

16. The system of claim 11, wherein the computing appliance accessing the disaster recovery medium includes connecting to the disaster recovery medium through the computing appliance's universal serial bus port.

17. The system of claim 11 wherein the computing appliance accessing the disaster recovery medium includes connecting to the disaster recovery medium over a network connection.

18. The system of claim 11, wherein the disaster recovery medium includes a configuration bundle associated with the computing appliance retrieved from a storage location upon detecting a failure of the computing appliance.

19. The system of claim 18, wherein the disaster recovery medium includes one or more software patches applied to the computing appliance.

20. The system of claim 19, wherein the disaster recovery medium includes one or more software patches downloaded through a connection to a remote server over a network connection.

* * * * *